US006405877B1

(12) United States Patent
Nemedi et al.

(10) Patent No.: US 6,405,877 B1

(45) Date of Patent: Jun. 18, 2002

(54) SCREEN FOR SEPARATING SWARF

(76) Inventors: William D. Nemedi, 4628 Wimbledon Way, Kalamazoo, MI (US) 49009; Robert J. Nemedi, 2576 Mandigo Rd., Kalamazoo, MI (US) 49002

(*) Notice: Subject to any disclaimer, the term of this patent is extended or adjusted under 35 U.S.C. 154(b) by 19 days.

(21) Appl. No.: 09/604,346

(22) Filed: Jun. 27, 2000

Related U.S. Application Data

(62) Division of application No. 09/235,722, filed on Jan. 22, 1999, now Pat. No. 6,129,851.

(51) Int. Cl.[7] ............................ B01D 29/00; B04B 1/04

(52) U.S. Cl. ........................ 210/498; 210/373; 210/499; 494/36; 494/43

(58) Field of Search ................................ 210/373, 498, 210/499; 494/36, 43

(56) References Cited

U.S. PATENT DOCUMENTS 1,916,393 A 7/1933 Smith
3,957,652 A 5/1976 McGonigal ................. 210/498
4,186,096 A 1/1980 Areaux et al. .............. 210/377
4,936,822 A 6/1990 Nemedi ........................ 494/43
5,252,208 A 10/1993 Nemedi ....................... 210/373
5,275,727 A 1/1994 Nemedi ....................... 210/373
5,330,637 A 7/1994 Nemedi ....................... 210/232
RE35,307 E 7/1996 Nemedi ........................ 494/43
5,944,992 A 8/1999 Nemedi et al. ............. 210/373

*Primary Examiner*—David A. Reifsnyder
(74) *Attorney, Agent, or Firm*—Marshall, Gerstein & Borun

(57) ABSTRACT

The invention relates generally to a method of separating swarf lubricant from swarf solids. A centrifuge parts separator utilizes a screen which preferably comprises a cylindrical shaped member formed in one or more component parts with a plurality of spaced fluid passage openings therein with the ratio of the distance between the center lines of adjacent openings (x) and the median width of the openings (y) being x/y of at least 18/1. The swarf is centrifuged in the separator during the course of which operation, substantially all the swarf fluid passes through the screen openings whereas substantially all the swarf solid passes over the screen, the separated swarf fluids and solids each being directed to a collection site.

2 Claims, 4 Drawing Sheets

FIG.2
PRIOR ART
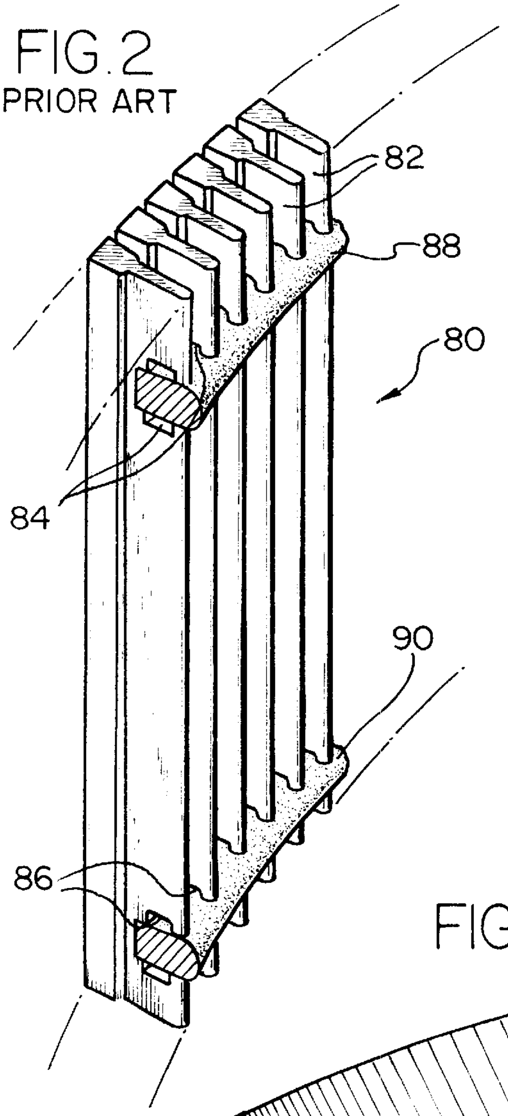
FIG.4
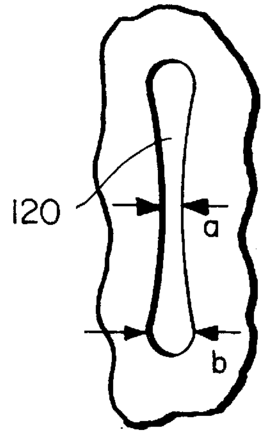
FIG.5
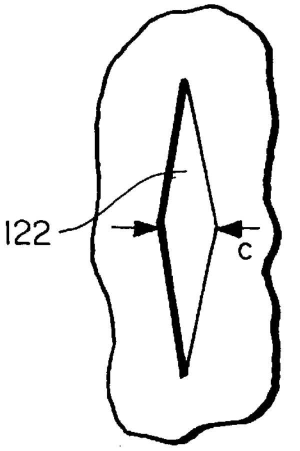
FIG.6
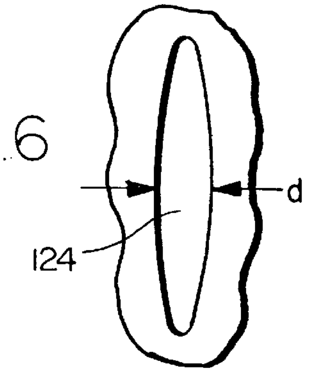
FIG.3
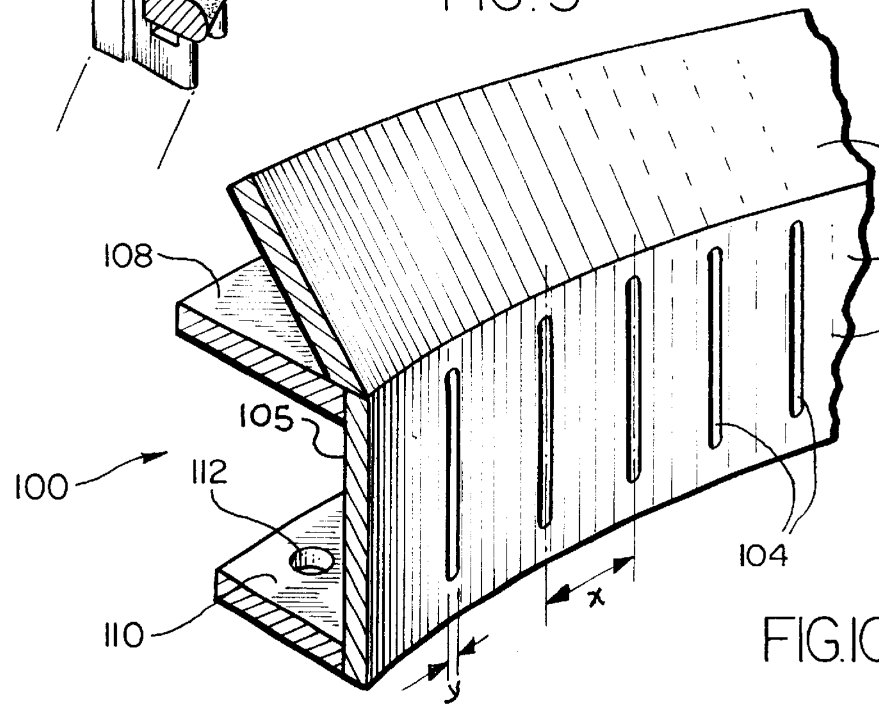
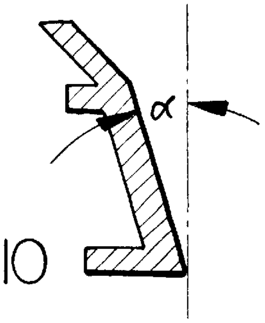
FIG.10

SCREEN FOR SEPARATING SWARF

This is a divisional of U.S. application Ser. No. 09/235,722 filed Jan. 22, 1999, now U.S. Pat. No. 6,129,851.

BACKGROUND OF THE INVENTION

Heretofore, chip wringers have successfully been utilized to separate coolant/lubricating fluid from scrap material. A typical application occurs following a lathe or other machining operation in which helical metal chips of varying discrete length are formed. The scrap chips and coolant to be separated are collected and directed to a centrifugal chip wringer. As the material is centrifuged, it moves up a rotating bowl wall and passes over a screen having openings therein. The fluid separates from the scrap solid chips, and passes through the screen openings where it then is collected, often for reuse. The dried solid chips continue to pass over the screen and thereafter are blown to a collecting station.

While centrifugal chip wringers have been quite satisfactory for separating fluids from chip materials, the wringers unfortunately have not heretofore served to efficiently separate what is referred to as "swarf." Swarf is a slurry-like material generally generated in the course of a fine machining or grinding operation in which the scrap particles formed are quite fine as compared to the more discrete, finite-size chips generated, for example, in a lathe operation. Illustratively, in a grinding operation on steel stock, there is generated both a finished ground product as well as scrap product or swarf in which the swarf comprises (i) fine steel filings ground off the steel stock, (ii) fine pieces of metal or other material from the grinding tool, and (iii) lubricant/coolant. It has been found that in attempts to separate the coolant/lubricant from the swarf utilizing a conventional centrifugal chip wringer having a wedge wire screen, the swarf travels up the bowl wall of the centrifuge onto the screen wall. Unfortunately, it has been found that in most instances, the swarf material cannot be separated satisfactorily with a conventional screen known as a wedge wire screen in which a plurality of spaced members, such as illustrated in FIG. 2, are employed. It has been found that, after a relatively short period of time, the swarf plugs the screen openings such that either minimal separation occurs and/or the swarf solids pass through one or more screen openings with the fluid which also is undesirable. As a result, centrifugal separation of swarf has been an objective that has not heretofore been achieved with conventional centrifuge chip wringers having wedge wire screens.

What is desired is to utilize a centrifuge chip wringer that can successfully separate both chip and swarf materials. Further, it is desired to separate swarf material without excessive plugging of screen openings or having an excessive amount of the swarf solids passing through screen openings.

SUMMARY OF THE INVENTION

The present invention is directed to a centrifuge separating system which serves to separate swarf solids from lubricating and/or cooling fluids. Moreover, the system of the present invention serves to overcome the problems of swarf separation that heretofore existed while at the same time fulfilling the above-referenced desires for swarf separation.

Briefly, the invention comprises a centrifugal wringer utilizing a rotating bowl which directs swarf material upwardly along the internal surface of an outwardly and upwardly extending bowl wall. Swarf is defined herein as a combination of both fluids and solids in which the solids are relatively small, discrete, fine sand-like particles having a finite size unlike chips which are discrete generally elongated helical-shaped members. Typically, swarf comprises a composite of 40–50% total weight lubricant and 60–40% solids, the solids being granular or sand-like particles. Occasionally, it will be found that some chips are mixed in with the swarf.

The swarf passes over a screen attached to the rotating bowl. The screen has a plurality of spaced openings therein as disclosed in U.S. application Ser. No. 08/926,838, filed Sep. 10, 1997, and issued as U.S. Pat. No. 5,944,992 on Aug. 31, 1999 the entire disclosure of which is incorporated herein by reference.

As the swarf passes over the screen, the fluid separates from the solids and passes through the screen openings to a collecting station. The separated, relatively dry solids continue to pass over the screen and then are blown or otherwise directed to a collection station.

Accordingly, the invention is directed to the separation of swarf materials according to the step of delivering swarf to be separated to a centrifugal wringer device which includes a rotatable bowl and a rotatable screen attached to the top of the bowl. The screen is a cylindrical-shaped member formed of one or more components and comprises a plurality of spaced openings having a median width dimension of "y," where "y" is approximately 0.030 to 0.040 inches on the inside swarf material-contacting surface of the screen when it is formed into its final formed cylindrical shape.

The screen openings are separated by a distance "x" between the center line from one opening to the center line of an adjacent opening. The screen is fabricated or otherwise made so that the spacing between the fluid passage openings "x" is maintained at a ratio of x/y with a ratio of at least 18/1, and preferably 100/1 or more being desired.

The method continues with the centrifuging of the swarf in the wringer, causing the swarf to be directed along the bowl wall where it then passes onto the screen; separating the fluid from the solids in the swarf by passing the fluids through the openings in the screen while passing the solids past the screen; and, directing the separated swarf fluids to a first desired location and directing the separated swarf solids to a second desired location.

The system of the invention serves to separate swarf fluids from swarf solids satisfactorily.

Further, the screen can be cast or fabricated in one piece or, if desired, the screen can be formed of a plurality of screen segments. When made in one piece, the screen can be made sufficiently flexible such that it can be wrapped in a circular shape to fit into a centrifuge. Further, the screen of the invention can be formed with a plurality of slots or openings of differing shapes. Because the screen can be cast or fabricated with the desired surface distance/opening width ratio, the need for forming a screen out of a plurality of drawn bars is obviated.

BRIEF DESCRIPTION OF THE DRAWINGS

Further advantages of the invention will become apparent to those skilled in the art upon a reading of the following detailed description taken in conjunction with the accompanying drawings in which:

FIG. 2 shows an isometric view of a portion of a prior art "wedge wire" separator screen;

FIG. 3 shows an isometric view of a portion of a replaceable separator screen according to the invention;

FIG. 4 shows a first alternative slot configuration for a separator screen according to the invention;

FIG. 5 shows a second alternative slot configuration for a separator screen according to the invention;

FIG. 6 shows a third alternative slot configuration for a separator screen according to the invention;

DETAILED DESCRIPTION

Figure 1:
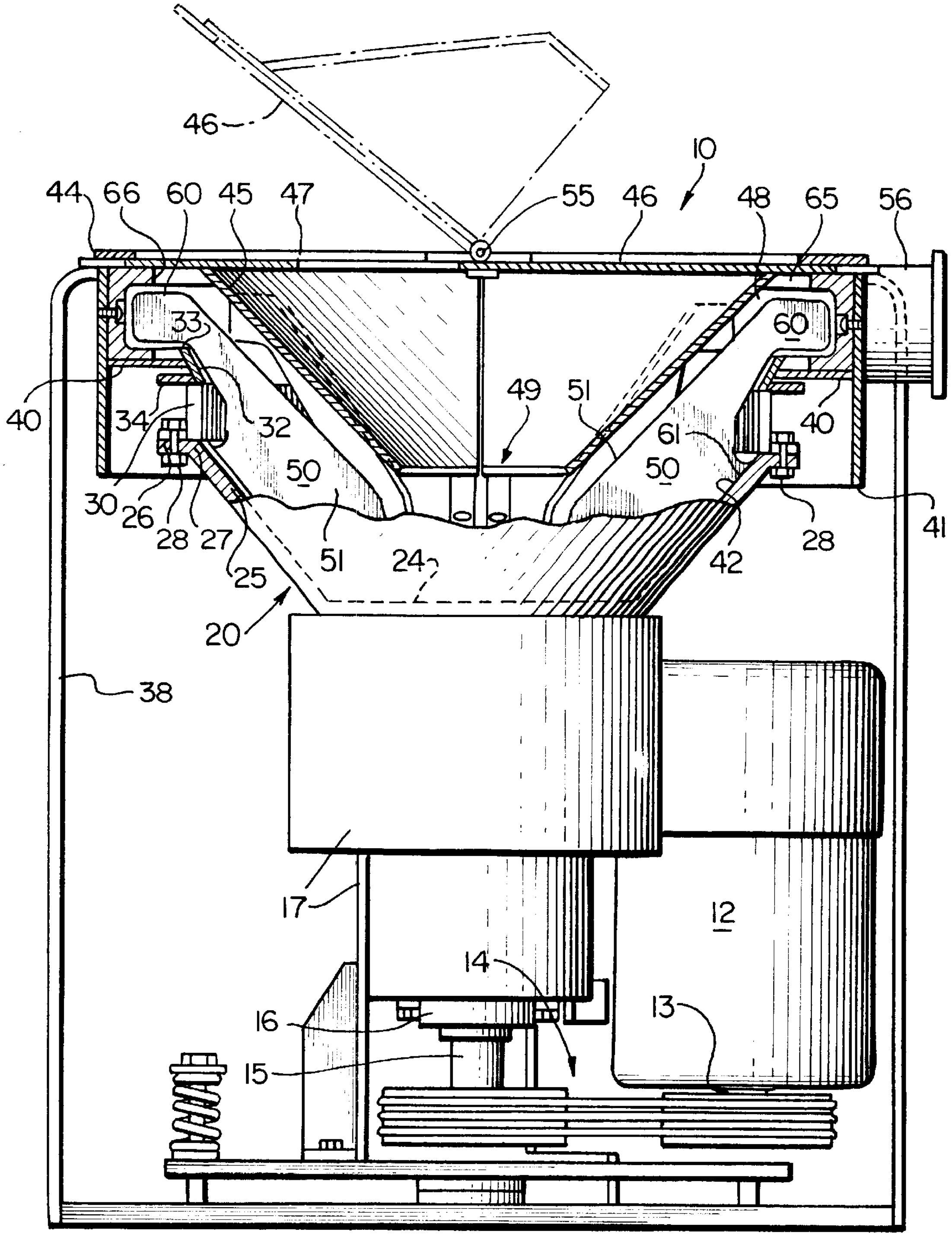
FIG. 1 shows a front, partial section view of a centrifugal separator apparatus including a replaceable separator screen according to the invention.

Referring to the drawings and particularly to FIG. 1, there is shown a centrifugal separator device generally designated 10 which includes a motor 12 which has a drive shaft 13 connected by a belt and pulley drive assembly 14 to one end of the centrifugal separator drive shaft 15. The shaft is disposed within a bearing assembly 16.

The remaining end of the drive shaft 15 is secured to a substantially cone or bell-shaped separator bowl 20. Upon actuation of the motor 12, the bowl 20 connected to the shaft 15 rotates. The cylindrical housing 17 encloses the lower end of the bowl 20 and the shaft 15.

A bottom wall 24 of the separator bowl 20, which has inner and outer wall surfaces, extends outwardly and terminates in a bowl wall 25. The wall 25 extends vertically upwardly and outwardly with a mounting flange 26 located at the upper end 27 of the bowl wall 25. A substantially cylindrical separator screen 30, which will be described in greater detail below, extends upwardly from the flange 26. The screen 30 permits discharge of lubricating liquid separated from the metal chips or swarf in the centrifuge separator bowl 20, the lubricant passing through the openings in the screen 30 while the metal chips or swarf are centrifuged upwardly past the screen 30. Liquid discharged through the openings in the screen 30 will be collected in a suitable collection chamber, not shown, preferably disposed within a casing chamber 38 in which the parts of the centrifugal separator device 10 are disposed. The screen 30 is secured to flange 26 by means of a plurality of suitable fasteners 28.

A conical portion 32 is secured to the upper edge of the screen 30 and extends radially outwardly in an upward direction to a dispensing edge 33. A radially extending flange 34 is secured to the centrifugal separator bowl 20 intermediate the juncture between the conical portion 32 and the screen 30. A radially inwardly directed flange 40 is secured to a cylindrical outer wall support member 41 which depends from and is attached to the top of a chamber 38 as seen in FIG. 1.

A cover 44 is fixed in any desired manner to the upper edge of the chamber 38. In the particular embodiment of FIG. 1, the cover 44 includes an upper conical member 45 which is fixedly attached to and depends from the cover 44. The conical member 45 comprises two pivotable cone-shaped portions 46, 47 whereby the outer wall of the conical member 45 defines the inner wall of an annular chip collecting chamber 48 and the cylindrical support wall member 42 defines the outer wall thereof.

The cone 45 converges in a downward direction to a location spaced immediately above and within the separator bowl 20. An opening 49 at the bowl lower end of the conical member 45 defines an air inlet as well as a material inlet for a mix of lubricant plus swarf or the like into the centrifuge separator device 10. Spaced blade assemblies 50 are securely fastened to and rotate with the rotatable separator bowl 20.

In operation, swarf to be separated is delivered to the top of the centrifuge 10 from a discharge end of a separator chute, not shown, which is well known in the art. The mixed fine solids and fluid enter the centrifuge 10 and pass through the opening 49 at the bottom of the conical member 45. The fluid mixed with the solids passes into the rotating separator bowl 20 where the materials to be separated are centrifuged outwardly and travel upwardly along both the internal surface of bowl wall 25 and the leading surfaces of the rotating blades 51 in blade assemblies 50. The lubricating fluid separates from the swarf solids and passes through the screen opening 30 to a collection chamber (not shown) where the lubricating fluid is collected. The rotating blades 51 also serve to draw or pull fluid such as air downwardly through the opening 49 in the cone 45. The air then passes upwardly through the space between the outside surface of the cone 45 and the bowl 20. Following separation from the lubricating fluid, the swarf solids continue to be directed upwardly by the centrifugal action of the separating device 10 past the screen 30 and the dispensing edge 33 where the separated swarf solids are directed out of the discharge chamber 48 and exit the chute 56 to a collecting site.

The separator bowl 20 is shown with a plurality of spaced blade assemblies 50 disposed within, the blades 51 preferably being releasably fixed to the bowl 20. As disclosed in Nemedi U.S. Pat. No. 4,936,822, the entire disclosure of which is incorporated herein by reference, each blade assembly 50 includes a pad 61, which is secured to the bowl 20 and extends at right angles to the blade 51. The blade 51 projects upwardly beyond the location of the screen 30 into the chamber 48 of the discharge housing 65 as shown in FIG. 1. Each blade 51 includes a radially extending paddle 60 at its upper end, which is disposed within the scroll housing described hereafter.

The air movement within the scroll or discharge chamber 48 plus the blade paddles 60 serve to direct or otherwise move the swarf solids through the annular-shaped portion of the discharge chamber 48 and the exit chute 56. The discharge chamber 48 comprises the annular-shaped support walls 40, 41, which support an annular wall or lining 66. As each blade 51 and its respective paddle 60 rotates in a clockwise direction, air and swarf solids are swept, blown, or pulled past the annular wall 66 and out the discharge outlet 56.

Referring to FIG. 2, a portion of a prior art separator screen 80 used with the centrifugal separator device 10 is shown. The separator screen 80 is formed by first providing a plurality of drawn or extruded bars 82. The bars 82 are fabricated from a material that can be drawn or extruded into the bar shape. The extruded bar shape is then cut into individual lengths to form the bars 82. Upper and lower notches 84, 86 are cut into the back surface of each of the bars 82. Thereafter, the notched bars 82 are placed in a form whereby the requisite spacing between the bars 82 is carefully arranged to form the desired fluid passage openings. Once the bars 82 are aligned in their appropriate positions, upper and lower cross rods 88, 90 are placed in the upper and lower notches 84, 86, respectively, and welded to the bars 82 to complete the screen fabrication. It will be appreciated that the time and effort associated with making a screen of this type are quite significant such that the screen and the conventional part separator device constitutes a costly component.

FIG. 3 illustrates an improved separator screen 100 according to the invention. The separator screen 100 is formed from a cylindrical-shaped member 102, which can be formed in one or more component parts. The wall of the cylindrical-shaped member 102 has a plurality of fluid passage openings 104 passing therethrough. An optional conical portion 106 is secured to the upper edge of the cylindrical-shaped member 102, and extends radially outwardly in an upward direction. Upper and lower radially extending flanges 108, 110 are secured to the outer surface of the cylindrical-shaped member 102. The lower radially extending flange 10 has a plurality of holes 112 extending therethrough spaced about the lower flange 10 to align with corresponding holes in flange 26 to allow securing of the separator screen 100 to the separator bowl 20 by a plurality of fasteners 28.

The separator screen 100 is fabricated from a material with good wear-resistance characteristics, such as 304 stainless steel, 316 stainless steel, or AR500 carbon steel alloy. The cylindrical-shaped member 102 of the separator screen 100 is fabricated from a single flat piece of material or, if desired, from a plurality of screen segments. While the single piece or segments are still flat, the fluid passage openings 104 are cut into the material. Alternatively, these components can be cast with the openings 104 included therein, or the fluid passage openings 104 can be cut into the cylindrical-shaped member 102 after piece or segments have been rolled or bent into shape.

The fluid passage openings 104 have a median screen opening width y and are separated by a distance x between the center line from one opening 104 to the center line of an adjacent opening 104. The screen is made so that the spacing between fluid passage openings 104 is maintained at a ratio of x/y. A ratio of the spacing x to the median screen opening y of greater than 18/1, and preferably 100/1 or more is desired. By maintaining ratios of this magnitude, the separator screen 100 provides an increased surface wear area over which the fluids and solids travel across the screen. The increased surface area reduces the wear previously incurred with conventional screens because the centrifuged solids travel across an increased surface area not previously available.

After the openings 104 have been formed, the single piece or plurality of segments can be formed into the cylindrical-shaped member 102. When made of one piece, the cylindrical-shaped member 102 can be made sufficiently flexible such that it can be wrapped in a circular shape to fit the separator bowl 20. When formed of a plurality of screen segments, the segments are, if necessary, bent into an arcuate shape, and secured together to form the cylindrical-shaped member 102. After the cylindrical-shaped member 102 has been formed, conical portion 106 and upper and lower flanges 108, 110 can be welded thereto to form the separator screen 100.

The maximum width of the fluid passage openings 104 on the inside surface 103 of the rolled cylindrical member 102 should be approximately 0.030 to 0.040 inches, to prevent unwanted swarf solids from passing therethrough. The exact width of the fluid passage openings 104 will vary based on the thickness of the plates used to form the cylindrical shaped member 102 and the diameter of the separator bowl 20 at the upper end 27 of the bowl wall 25. For example, a first flat strip having a given thickness rolled to fit a 30 inch separator bowl 20 must have 0.060 to 0.080 inch opening width therethrough along the flat surface before shaping or rolling the screen to provide a y dimension of 0.030 to 0.040 inches at the inner surface of the cylindrical member 102. The width at the outside surface 105 of the cylindrical member 102 will be somewhat greater than 0.060 to 0.080 inches. Similarly, a second flat strip having the same thickness rolled to fit a 40 inch separator bowl 20 will require opening widths of less than 0.060 to 0.080 inches due to the reduced curvature of the strip after rolling it to form the screen. The determination of the proper slot widths to prevent the passage of metal chips or swarf through the openings 104 will be apparent to those of ordinary skill in the art, guided by the present disclosure.

It has been found, unexpectedly, that when using a screen of the invention having an x/y ratio of at least 18/1 and preferably 100/1 or more, swarf also can be separated into the desired fluids and relatively dry solids even though the fine granular-like solid pieces that make up the swarf solids are substantially fine. It has been found that the swarf can be separated when the median y dimension is approximately 0.03–0.04 inches. For example, in a grinding operation, a fine granular-like scrap material is formed comprising residue filings from a grinding tool as well as granular-like metal stock filings from a bar stock. These filings mix with the lubricating/coolant fluid to form a slurry-like mixture referred to as swarf. The granular-like grindings individually generally appear as small sand-like particles; however, in composite form, the filings or grindings combine together to form a fluid-like composite which, when mixed with a lubricating fluid used in a machining operation, forms a slurry-like material or swarf. Utilizing the screen of the invention, it has been found that swarf can be satisfactorily separated with the lubricating/coolant fluid passing through the screen openings while the relatively dry swarf solids pass over the screen without either plugging or passing substantially through the screen openings so that the dried solids can be subsequently collected at a solids collection site.

The fluid passage openings 104 shown in FIG. 3 have a generally rectangular shape with radiused ends. FIGS. 4–6 illustrate alternative opening configurations for use with the separator screen according to the present invention. FIG. 4 shows a fluid passage opening 120 having an elongated hyperbolic shape with radiused ends. The opening 120 has a minimum width a in the center of the opening 120 and a maximum width b proximate each of the radiused ends which is less than the width of the smallest metal chip to be separated.

FIG. 5 illustrates another alternative fluid passage opening 122 in the shape of a diamond. The opening 122 has a maximum width c at the center of the opening and a converges to a point at either end. In this configuration, the median opening width y is equal to one-half the maximum width c. Yet another alternative fluid passage opening 124 is shown in FIG. 6 wherein the opening 124 is in the shape of an ellipse. A maximum width d of the opening 124 is equal to the lesser diameter d of the ellipse which is located at the center of the opening 124 and is smaller than the width of the smallest metal chip. Other fluid passage opening configurations that facilitate separation of a lubricant from the metal chips or swarf will become apparent to those skilled in the art and are contemplated by the inventors as having use in connection with the separator screen of the invention. For example, it is contemplated that one could utilize a form of a slot which is disposed or offset at an angle from the vertical slot shown in FIG. 3 and/or the slot could be formed in an arc-like shape.

Figure 7:
FIG. 7 shows a photograph of swarf prior to separation in which the fluid has separated somewhat from the solids as the swarf is in an at rest position.
Figure 8:
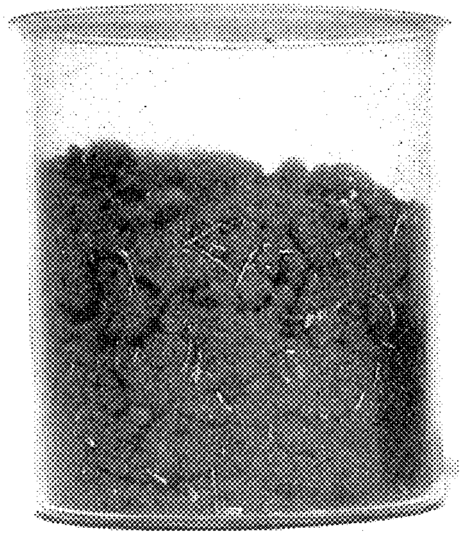
FIG. 8 shows dried swarf solids after separation in accordance with the invention.
Figure 9:
FIG. 9 illustrates a portion of swarf solids following separation displayed on a sheet of paper with small elongated metal chips dispersed among the dried swarf solids; and, FIG. 10 shows another embodiment of the screen in which the screen is positioned at an angle a from the vertical.

An example of swarf separation according to the invention is illustrated in FIGS. 7–9. Swarf, as defined herein and comprising a slurry-like mixture, is shown in FIG. 7 and is formed of grinding tool particles and steel stock particles mixed with lubricating oil. If the slurry is permitted to sit at rest undisturbed over a relatively short period of time, e.g., approximately six minutes, it will separate on its own to some degree so that one can observe some separation with fine solid particles sitting at the bottom of the container in FIG. 7 while lubricating/cooling oil rests on top of the solids.

When this swarf material, such as illustrated in FIG. 7, was placed in a 20" centrifugal wringer offered for sale by Inter-Source Recovery Systems, Inc., Kalamazoo, Michigan, Model No. 4200, shown in Inter-Source's 1997 catalog, which utilizes a screen of the invention in which the screen had the configuration illustrated in FIG. 3 with an x value of 1.00", a y value of about 0.040", and an x/y ratio of about 25, and centrifuged at a drive shaft rotation of about 1630 RPM to produce approximately a 700 G force, it was found that, after one pass of the material through the separator, the swarf, which was estimated to have about 45% of the total weight comprising liquid lubricant, separated such that solids exiting the separator had a dryness of approximately 97%. Substantially all the fluid had been removed, the solids discharge forming a discrete composite. Dried swarf solids are illustrated in the photograph of FIG. 8.

FIG. 9 is a photograph of separated or dried swarf solids placed on a sheet of paper. It will be observed that the individual swarf solids are akin to fine granular sand-like particles. In this particular separation, a small amount of metal chips also were separated, the chips being seen in FIG. 9 as small elongated discrete members.

While swarf separation was conducted with a 20" separator, it is contemplated, swarf separation can take place using larger separators, i.e., 30" and 40" separators, utilizing a screen of the invention. For example, it is envisioned that a conventional 30" centrifugal wringer such as offered for sale by Inter-Source Recovery Systems, Inc., Kalamazoo, Mich., Model No. 2200, shown in Inter-Source's 1997 catalog, utilizing a screen of the invention in the centrifuge can be employed. In this embodiment, the screen has a configuration as shown in FIG. 3 with an "x" value of 0.050, a "y" value of 0.030, and an x/y ratio of 16.7. It is expected the separator will be centrifuged to operate at a drive shaft rotation of about 1450 RPM and is expected to produce approximately a 900 G force with the expectation that after one pass of the material through the separator, the swarf, which is estimated to have about 45% of the total weight comprising liquid lubricant, will be separated such that solids exiting the separator will have a dryness of approximately 97%.

Similarly, it is contemplated that an application utilizing a conventional 40" centrifugal wringer as offered for sale by Inter-Source Recovery Systems, Inc., Kalamazoo, Mich., Model No. 8200, utilizing a screen of the invention can be employed to separate swarf. In this embodiment, the screen has a configuration as shown in FIG. 3 with an "x" value of 0.01", a "y" value of about 0.004, and an x/y ratio of 25. It is expected the centrifugal wringer or separator will be centrifuged and operated at a drive shaft speed of about 1260 RPM to produce approximately an 890 G force with the expectation that after one pass of the material through the separator, the swarf, which is estimated to have about 45% of the total weight comprising liquid lubricant, will be separated such that solids exiting the separator will have a dryness of approximately 97%.

The operating speed for different size separators or wringers will vary depending upon size, with the smaller size wringers requiring operating at higher speeds. The determination of the optimum operating speed for a given size wringer and swarf can be determined by a person skilled in the art without any undue experimentation. It is believed that when employing larger size separators, e.g., 40", the optimum rotational speed of the drive shaft would be reduced as compared to a smaller size wringer, e.g., 20", to achieve the gravitational force required for swarf separation.

FIG. 10 shows a further screen embodiment in which the screen wall surface has been offset from the vertical by an angle $\alpha$ of about 2°–15° and preferably an angle of 10°.

While the invention has been described with reference to specific examples, which are intended to be illustrative only and not to be limiting of the invention, it will be apparent to those of ordinary skill in the art that changes, additions, and/or deletions may be made to the disclosed embodiment without departing from the spirit and scope of the invention. Moreover, the swarf separator invention disclosed and claimed herein can be utilized for both continuous and batch separation.

What is claimed is:

1. A screen adapted for attachment to an end of a bowl wall of a centrifugal separator in which the screen has a surface upon which swarf material is adapted to travel inclined at an angle $\alpha$ to the vertical of about 2°–15° and said screen has a plurality of spaced openings each having a median width dimension of "y" and the distance between the center lines of adjacent openings being "x" with the ratio of x/y being at least 18/1.

2. The screen of claim 1 in which the median "y" dimension is at least about 0.03 inches.

* * * * *